(12) United States Patent
Couvering (10) Patent No.: US 8,432,570 B1
(45) Date of Patent: Apr. 30, 2013

(54) USING BIT ARRAYS IN INCREMENTAL SCANNING OF CONTENT FOR SENSITIVE DATA

(75) Inventor: David Van Couvering, Berkeley, CA (US)

(73) Assignee: Symantec Corporation, Mountain View, CA (US)

( * ) Notice: Subject to any disclaimer, the term of this patent is extended or adjusted under 35 U.S.C. 154(b) by 362 days.

(21) Appl. No.: 12/847,501

(22) Filed: Jul. 30, 2010

(51) Int. Cl.
*G06F 15/00* (2006.01)
(52) U.S. Cl.
USPC ........................................... 358/1.15
(58) Field of Classification Search ................. 358/1.15
See application file for complete search history.

(56) References Cited

U.S. PATENT DOCUMENTS

2011/0296187 A1* 12/2011 Bisso et al. ................... 713/176

* cited by examiner

*Primary Examiner* — Saeid Ebrahimi Dehkordy
(74) *Attorney, Agent, or Firm* — Lowenstein Sandler LLP (57) ABSTRACT

A method for incremental scanning of documents may include identifying documents to be scanned for sensitive information according to at least one data loss prevention (DLP) policy, the documents being associated with a bit array. The method may further include applying, for each document, a set of functions to a key of the document, identifying positions in the bit array that correspond to outputs of these functions, refraining from scanning the document when values of all of the identified positions in the array indicate that the document has already been scanned, and scanning the document when a value of at least one of the identified positions in the array indicates that the document has not yet been scanned.

20 Claims, 9 Drawing Sheets

USING BIT ARRAYS IN INCREMENTAL SCANNING OF CONTENT FOR SENSITIVE DATA

FIELD OF INVENTION

Embodiments of the invention relate to the field of processing data, and more particularly, to scanning content for sensitive data using bit arrays.

BACKGROUND OF THE INVENTION

Data Loss Prevention (DLP) involves computer and information security, where DLP systems identify, monitor, and protect data in use (e.g., endpoint actions), data in motion (e.g., network actions), and data at rest (e.g., data storage). Typically, a DLP system creates fingerprints of sensitive information that requires protection, and then uses the fingerprints to detect the presence of sensitive information in various files, messages and the like. Sensitive information may be stored in a structured form such as a database, a spreadsheet, etc., and may include, for example, customer, employee, patient or pricing data. In addition, sensitive information may include unstructured data such as design plans, source code, CAD drawings, financial reports, etc.

In order to effectively prevent the loss of sensitive information, it is important to scan newly introduced and newly modified documents to determine whether they contain sensitive information that needs to be protected. However, current DLP solutions are unable to effectively identify which documents have already been scanned and which documents have been introduced or modified since a scan last took place. Because of this, current DLP solutions require every scan to re-scan documents that have already been scanned and are therefore inefficient.

SUMMARY OF THE INVENTION

A method and apparatus for incremental scanning of documents is described. In an exemplary method of one embodiment, a computer system identifies a plurality of documents to be scanned for sensitive information according to at least one data loss prevention (DLP) policy. The plurality of documents is associated with a bit array. For each of the plurality of documents, the computer system applies a set of functions to a key of the document and identifies a plurality of positions in the bit array that correspond to outputs of the functions in the set of functions. When values of all of the plurality of positions in the array indicate that the document has already been scanned, the computer system refrains from scanning the document. When a value of at least one of the plurality of positions in the array indicates that the document has not yet been scanned, the computer system scans the document for sensitive information according to the DLP policy.

In some embodiments, the computer system updates the bit array to indicate that the document has been scanned after scanning the document for sensitive information. In some embodiment, the computer system is one of a plurality of scanning servers. In some embodiments, the exemplary method includes sending the updated bit array to a controller for distribution to one or more of the plurality of scanning servers.

In some embodiments, the computer system generates a key for each of the plurality of documents. In some embodiments, the key is generated based on at least one of a file path, a modification date, and a size of the document. In some embodiments, the set of functions is a set of hash functions.

In some embodiments, the exemplary method includes determining whether the plurality of documents is associated with a bit array, and, when the plurality of documents is not associated with a bit array, creating a bit array and associating the plurality of documents with the created bit array.

In some embodiments, the computer system creates a new bit array for the plurality of documents associated with an existing bit array, updates the new bit array to identify documents in the plurality of documents that have been scanned for sensitive information, and replaces the existing bit array with the new bit array.

In some embodiments, the exemplary method includes determining that the existing bit array is full, creating a new bit array for the plurality of documents, chaining the new bit array to the existing bit array, when values of all of the plurality of positions in the new array indicate that the document has already been scanned, refraining from scanning the document, and updating the new bit array to identify that the document has been scanned after scanning the document for sensitive information.

In addition, a computer readable storage medium for determining whether a document is to be protected is described. An exemplary computer readable storage medium provides instructions, which when executed on a processing system causes the processing system to perform a method such as the exemplary methods discussed above.

Further, a system for determining whether a document is to be protected is described. An exemplary system may include a memory and a processor coupled with the memory. In some embodiments of the exemplary system, the processor is to identify a plurality of documents to be scanned for sensitive information according to at least one DLP policy. The plurality of documents is associated with a bit array. For each of the plurality of documents, the processor is to apply a set of functions to a key of the document and identify a plurality of positions in the bit array that correspond to outputs of the functions in the set of functions. When values of all of the plurality of positions in the array indicate that the document has already been scanned, the processor is to refrain from scanning the document. When a value of at least one of the plurality of positions in the array indicates that the document has not yet been scanned, the processor is to scan the document for sensitive information according to the DLP policy.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for incremental scanning of documents is described. In one embodiment, a computer system identifies documents that are to be scanned for sensitive information according to at least one data loss prevention (DLP) policy. The documents are associated with a bit array that is used to track which of the documents have been scanned before. A document is a file, a message, a web request or any other data item that is stored on a storage medium and is accessible using a name or any other identifier. For each document, the computer system applies a set of functions to a key of the document and identifies positions in the bit array that correspond to outputs of the functions in the set of functions. The key represents a current version of the document. When the values of all of the positions in the array indicate that the document has already been scanned, the computer system refrains from scanning the document. When at least one of the values indicates that the document has not yet been scanned, the computer system scans the document for sensitive information according to the DLP policy.

Embodiments of the present invention provide a DLP system that scans documents incrementally by using a bit array to determine whether a particular document in its current version has already been scanned. As a result, the DLP system is able to scan only those documents that have been modified or introduced since a previous scan without maintaining a database to store data specifying which documents have already been scanned and which of the scanned documents have been modified since the previous scan.

In the following description, numerous details are set forth. It will be apparent, however, to one of ordinary skill in the art having the benefit of this disclosure, that embodiments of the present invention may be practiced without these specific details.

Figure 1:
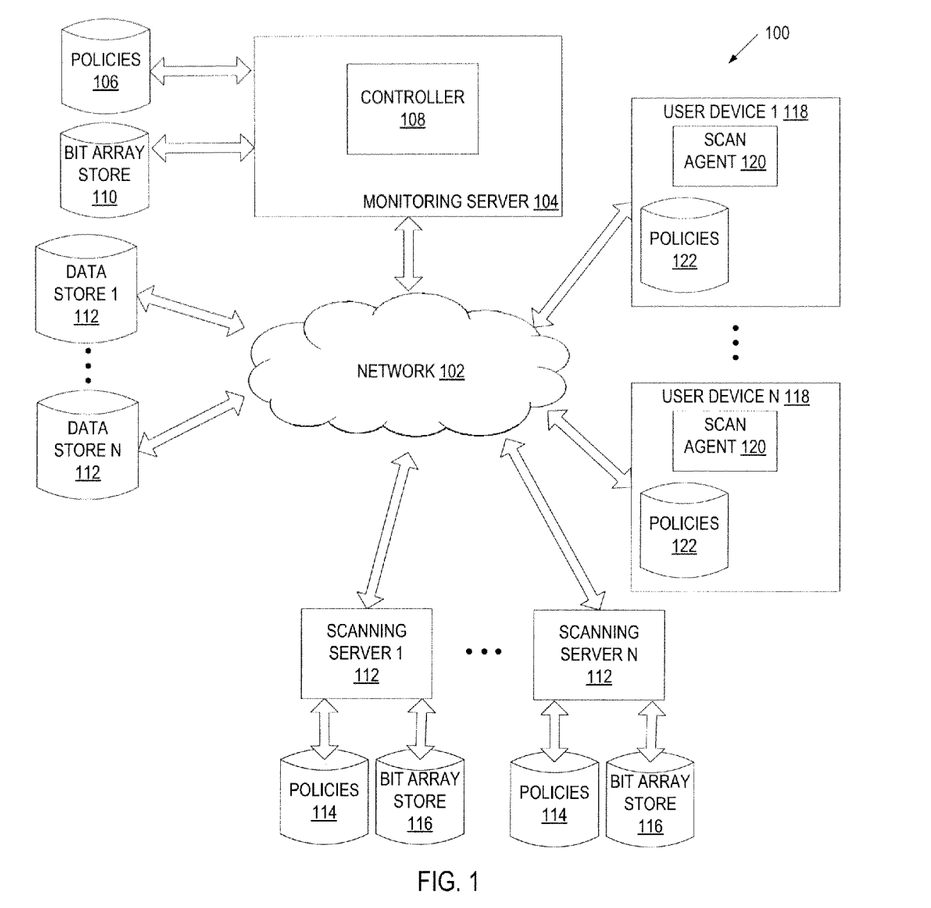
FIG. 1 is a block diagram of exemplary network architecture in which embodiments of the invention may operate.

FIG. 1 is a block diagram of an exemplary network architecture 100 in which embodiments of the invention may operate. The network architecture 100 may include a monitoring server 104 one or more scanning servers 112 and user devices 118 coupled via a network 102 (e.g., public network such as the Internet or private network such as a local area network (LAN)). The user devices 118 may include personal computers, laptops, PDAs, mobile phones, network appliances, etc.

The monitoring server 104 and the scanning servers 112 may reside on the same or different machines (e.g., a server computer system, a gateway, a personal computer, etc.). They may run on one Local Area Network (LAN) and may be incorporated into the same physical or logical system, or different physical or logical systems.

Alternatively, system 104, the scanning servers 112 and user devices 118 may reside on different LANs that may be coupled together via the Internet but separated by firewalls, routers, and/or other network devices. In yet another configuration, the monitoring server 104 may reside on a server, or different servers, coupled to other devices via a public network (e.g., the Internet) or a private network (e.g., LAN). It should be noted that various other network configurations can be used including, for example, hosted configurations, distributed configurations, centralized configurations, etc.

The network architecture 100 further includes data stores 112 coupled to the network 102. The data stores 112 may represent a single or multiple data structures (databases, repositories, files, etc.) residing on one or more mass storage devices, such as magnetic or optical storage based disks, tapes or hard drives. The data stores 112 may store any kind of data pertaining to the operation of an organization including emails, shared workspaces, etc. The data stores 112 can be centralized data repositories that may contain sensitive documents and therefore need to be scanned by scanning servers 112. The data stores 112 may be, for example, part of a network-attached storage (NAS) system or a storage area network (SAN) system.

The monitoring server 104 protects sensitive information maintained by an organization. Sensitive information may be stored in a structured form such as a database, a spreadsheet, etc., and may include, for example, customer, employee, patient or pricing data. In addition, sensitive information may include unstructured data such as design plans, source code, CAD drawings, financial reports, human resources reports, customer or patient reports, pricing documentation, corporate mergers and acquisitions documentation, government (e.g. Securities and Exchange Commission) filings, and any other sensitive information that requires restricted user access. The monitoring server 104 protects sensitive information using DLP policies 106. A DLP policy includes rules for scanning content to detect the presence of sensitive information. The content to be scanned may be stored in centralized data repositories such as data stores 112 that may potentially contain documents with sensitive information. In addition, the content to be scanned may include documents associated with a client device such as user devices 118. Documents associated with a user device 118 may include documents stored locally on user device 118 and network-based documents stored for user device 118 (e.g., as part of NAS or SAN system). A document can be a file, a message, a web request or any other data item that is stored on a storage medium and is accessible using a name or any other identifier.

Monitoring server 104 may host controller 108. Alternatively, monitoring server 104 and controller 108 may reside on separate servers. In order to protect the sensitive information, monitoring server 104 may instruct controller 108 to scan all or portions of the data stores 112 for sensitive information. Monitoring server 104 may also instruct scan agents 120 located on one or more of the user devices 118 to scan documents stored locally for sensitive information. Monitoring server 104 may do this according to one or more of the DLP policies 106.

When monitoring content for the presence of sensitive information, the monitoring server 104 may not use the actual source data (the actual sensitive information) but rather fingerprints of the source data, to avoid exposing the sensitive information and to facilitate more efficient searching of the content. Fingerprints may include hashes of source data, encrypted source data, or any other signatures uniquely identifying the source data. Monitoring server 104 may distribute fingerprints to scanning servers 113 and scan agents 120, and scanning servers 112 and scan agents 120 may use fingerprints when scanning documents for sensitive information in accordance with one or more DLP policies 114 and 122, respectively.

A policy may include a set of rules that specify what sensitive information needs to be present in the documents being scanned in order to trigger a policy violation. In addition, policies may specify when particular documents should be scanned, which documents should be scanned, etc. Further, policies may specify which actions should be taken when the documents being scanned contain sensitive information. For example, the policy may require that access to the content be blocked, reported, etc. Monitoring server 104 creates DLP policies 106 (e.g., based on user input or based on relevant regulations) and distributes relevant DLP policies to various entities. For example, DLP policies 114 pertaining to scanning data stores 112 are distributed to scanning servers 112, and DLP policies 122 pertaining to scanning content stored on user devices 118 are distributed to user devices 118.

An organization may maintain multiple data stores 112 and may store a large number of documents in each data store 112. The stored documents may be frequently modified by different employees of the organization and new documents may be often added to the data stores 112. Hence, DLP policies 114 may request that data stores 112 be scanned frequently to prevent loss of sensitive information. In order to enable a reliable scanning mechanism, scanning is distributed across several scanning servers 112 managed by controller 108. Controller 108 receives requests to scan documents located in data stores 112 from monitoring server 104 or from other sources and passes them to one of the scanning servers 112 for scanning.

Due to the vast amounts of data maintained by large enterprises, scans of data stores 112 can take a significant amount of time (e.g., several months or even years depending on the size of data stores 112) and resources. In addition, frequent scans of documents associated with user devices 118 require significant resources as well. Embodiments of the present invention reduce the number of required resources by providing an incremental scanning mechanism that only scans new or modified data items and by utilizing bit arrays that identify new and modified data items requiring scanning. As will be discussed in more detail below, controller 108 may maintain bit arrays associated with data stores 112 in a bit array store 110 and may distribute the bit arrays across the scanning servers 112. In one embodiment, a bit array corresponds to a Bloom filter which represents a space-efficient probabilistic data structure that is used to test whether an element (a key of a document) is a member of a set. The probability of false positives is configurable by varying the size of the bit array.

In one embodiment, when a scanning server 112 receives a request to scan documents from controller 108, scanning server 112 determines which of the requested documents in their current form have already been scanned for sensitive information using a bit array. Scanning server 112 then refrains from scanning the documents that have already been scanned and only scans documents that have not yet been scanned (e.g., they have been modified or introduced since a previous scan). As discussed above, scanning server 112 scans the documents in accordance with one or more DLP policies.

In one embodiment, user devices 118 contain a scan agent 120 for scanning documents associated with the user devices in accordance with DLP policies 122. In some embodiments, the scan agent 120 periodically scans all the documents associated with a user device 118. In alternative embodiments, the scan agent 120 does not scan all the documents but rather determines which documents in their current form have already been scanned for sensitive information using bit arrays. Scan agent 120 may then refrain from scanning the documents that have already been scanned and only scan documents that have not yet been scanned (e.g., they have been modified or introduced since a previous scan). In this alternative embodiment, the scan agent 120 may be coupled to a bit array store (not shown) for storing bit arrays used in scanning documents. As discussed above, scan agent 120 scans the documents in accordance with one or more DLP policies.

Embodiments of the invention significantly reduce storage and network overhead for incremental scanning of large content repositories by utilizing bit arrays rather than a database to store information specifying which documents have already been scanned and which of the scanned documents have been modified since the last scan. In particular, when allowing an insignificant false positive rate, the use of bit arrays can reduce the storage and network overhead to 5 bytes per document from an estimated 50 bytes per document (when maintaining a database for tracking previously scanned and unmodified documents).

Figure 2:
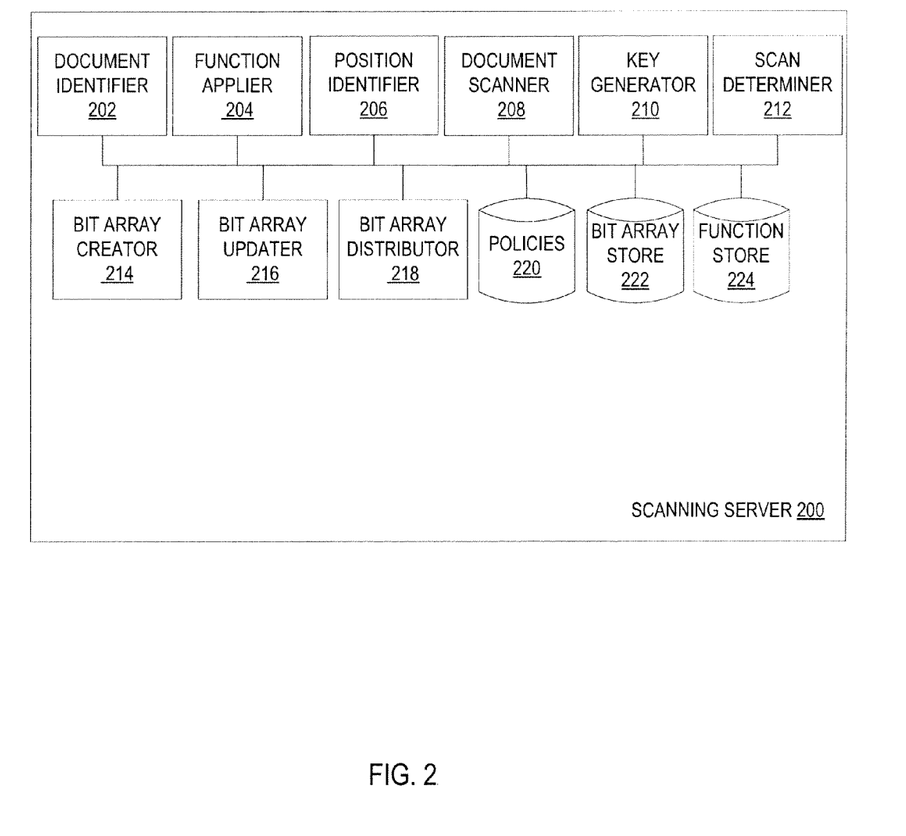
FIG. 2 is a block diagram of one embodiment of a scanning server.

FIG. 2 is a block diagram of one embodiment of a scanning server 200. The scanning server 200 may include a document identifier 202, a function applier 204, a position identifier 206, a document scanner 208, a key generator 210, a scan determiner 212, a bit array creator 214, a bit array updater 216, a bit array distributor 218, policies 220, and a bit array store 222. The components of the scanning server 200 may represent modules that can be combined together or separated into further modules, according to some embodiments.

The document identifier 202 may identify documents that are to be scanned for sensitive information. In some embodiments, the documents to be scanned may be part of a centralized data repository and are to be scanned over a network. Document identifier 202 may receive a request to scan the documents from a controller server in accordance with one or more DLP policies. The documents to be scanned may be one or more directories of documents, part of a directory of documents, etc.

Key generator 210 may generate a key for each of the documents that are to be scanned. The key may be a string of characters, and the string may be generated based on, for example, the file path of the document, the date that the document was last modified, and the size of the document. The key is unique for every document that is to be scanned. In so doing, key generator 210 ensures that if a document has been modified (the size has changed and/or the modification date is different) or introduced (e.g., moved from one directory to another resulting in a different file path) since the last time these documents were scanned, the key generated for the document will change.

Function applier 204 may apply a set of functions to each key generated by the key generator 210. The set of functions may be a set of hash functions, and each hash function may map the key input to a particular position in a bit array. The set of functions may be retrieved from a function store 224. The number of functions in the set may be based on a desired false positive rate and the number of documents to be scanned (e.g., number of documents in a directory). In this context, a false positive occurs when a document version that has not yet been scanned is incorrectly deemed to have already been scanned. For example, if the false positive rate is set at one in a million, no more than one out of a million documents will be classified as already having been scanned when they have yet to be scanned (e.g., because they were created after a previous scan or have been modified since a previous scan).

For every key, position identifier 206 may identify positions in a bit array associated with the documents to be scanned that correspond to the outputs of the set of functions. Position identifier 206 may retrieve the appropriate bit array from bit array store 222. For example, for a particular key, a set of 4 hash functions may output 4 values (e.g., 1, 3, 5, and 7). Position identifier 206 may then identify position 1, 3, 5, and 7 in a particular bit array. In one embodiment, an entire network share (e.g., an entire repository of documents) that is to be scanned may be associated with a single bit array. Alternatively, each directory of documents is associated with its own bit array. This may be done to decrease the amount of space in memory that the bit array takes up, to minimize the effects of any network connectivity issues or scan interruptions, etc. If the current documents are not associated with a bit array, position identifier 206 may instruct bit array creator 214 to create a bit array and associate the bit array to the documents.

Scan determiner 212 may determine whether the documents are to be scanned. Scan determiner 212 may make this determination based on the values of the bit array at each of the positions identified by position identifier 206. In some embodiments, if each of the identified bit array values indicates that the document has already been scanned for sensitive information, scan determiner 212 decides that the document is not to be scanned. If, however, any of the identified bit array values indicate that the document has not already been scanned, scan determiner 212 determines that the document is to be scanned and instructs document scanner 208 to scan the document. A value may indicate that a document has already been scanned when the value is a scanned value. A value may indicate that a document has not yet been scanned when the value is a not-scanned value. For example, the scanned value may be set to be 1, and the not-scanned value may be 0. In this case, if there are 4 identified positions and the values of each of the 4 positions in the bit array are 1, the document will not be scanned. If the value of any of the 4 positions is not 1 (e.g., if any of the 4 values are 0), scan determiner 212 instructs document scanner 208 to scan the document.

Document scanner 208 may scan documents that scan determiner 212 has determined have not yet been scanned. In some embodiments, document scanner 208 scans the documents for sensitive information using fingerprints of documents that have been classified as containing sensitive information. In one embodiment, document scanner 208 scans the documents in accordance with at least one DLP policy. Document scanner 208 may retrieve the DLP policy from policies store 220.

Bit array updater 216 updates bit arrays. When a document is scanned by document scanner 208, bit array updater 216 may update the bit array that the document is associated with to indicate that the document has been scanned. Bit array updater 216 may update the bit array by setting the values of all of the identified positions for that document to a scanned value (e.g., 1). For example, if the document has 4 identified positions, bit array updater 216 may set the value of all 4 positions to 1 after the document has been scanned by document scanner 208. By doing this, bit array updater 216 ensures that the document will not be scanned again in future scans unless it has been modified or moved. After all of the identified documents have been scanned, bit array updater 216 may store the updated bit array in bit array store 222. In some embodiments, bit array updater 216 may compress the bit array before storing it in bit array store 222. Bit array updater 216 may also mark the stored bit array to indicate that it has been updated.

Bit array creator 214 creates bit arrays for use in determining whether a document is to be scanned. Bit array creator 214 may create a new bit array when the documents identified for scanning are not associated with a bit array. Bit array creator 214 may create a bit array and associate the documents with it. The number of bits in the bit array may be based on the number of documents to be scanned (e.g., the number of documents in a directory) and the desired false positive rate. If the desired false positive rate is increased, the number of bits needed decreases. Therefore, if an organization is concerned about the amount of storage space utilized by the bit arrays, they may use a higher desired false positive rate to decrease the size of bit arrays that are created. Bit array creator 214 may store created bit arrays in a bit array store 222. Bit array creator 214 may also identify a set of functions (e.g., hash functions) that are to be applied to the documents by function applier 204. The number of functions in the set may also be based on the number of documents to be scanned and the desired false positive rate. After creating a bit array, bit array creator 214 may set all of the bit values in the array to a non-scanned value (e.g, 0).

Alternatively, bit array creator 214 may also create a new bit array for documents that are already associated with an existing bit array. This may done to ensure that the existing bit array does not get too full as new documents are added to a directory or documents are modified (and the number of documents to be scanned is too large compared to the number of bits in the existing bit array). Because the size of a bit array depends in part on the number of documents to be scanned, a bit array created after the number of documents has increased will be larger in size than a bit array created before the increase. In some embodiments, bit array creator 214 creates a new bit array every time a request for scanning is received. After creating a new bit array for documents that are already associated with an existing bit array, bit array creator 214 may instruct bit array updater 216 to update both the existing and new bit array after scan determiner 208 determines whether a document is to be scanned. Because the new bit array initially has all of its bit values set to a not-scanned value, bit array updater 216 may continue to only update the existing bit array when a document is scanned, but may update the new bit array for each document to indicate that it has been scanned (whether during the previous scan or during the current scan). When the scanning of all of the identified documents has been successfully completed, bit array updater 216 may remove the existing bit array from the bit array store and replace it with the new bit array. Refreshing the bit array in this manner may ensure that the key for any document that has been deleted or moved since a previous scan (and is therefore no longer part of the identified documents) is not added to the new bit array.

In some embodiments, when a new scan is requested, bit array updater 216 is not aware of how many documents have been modified or added to a collection (e.g., a directory) of documents since the previous scan. Because the false positive rate for the bit array associated with the collection of documents depends on the size of the bit array and the number of document scans associated with the collection, performing new document scans may cause the false positive rate to exceed a desired threshold (cause the bit array to become too "full"). In these embodiments, bit array updater 216 may check whether the existing bit array for the collection of documents is full (e.g., whether updating the bit array to indicate that a new document has been scanned would cause the false positive rate to exceed the desired threshold) before updating the bit array. In one embodiment, bit array updater 216 determines whether the bit array is full based on whether a dependency between the number of document scans associated with the collection, the size of the bit array and the false positive rate indicates that the desired false positive rate would be exceeded if the bit array were to be updated.

If the existing bit array is full, bit array updater 216 may instruct bit array creator 214 to create a new bit array and to "chain" the new bit array to the existing bit array (e.g., associate the collection of documents with the new bit array and associate the new bit array with the existing array). Bit array updater 216 may then instruct scan determiner 212 to check all "chained" arrays when determining whether to scan a particular document. Bit array updater 216 then updates only the new bit array when a document is scanned by document scanner 208. In some embodiments, bit array updater 216 may determine that multiple new bit arrays need to be created and "chained" together during a scan of the identified documents (e.g., because the first chained bit array is also full). By chaining the bit arrays in this manner, bit array updater 216 may ensure that scanned documents can be marked as having been scanned even when the existing bit array is full. However, chaining bit arrays results in an increase in the false positive rate based on the number of arrays that are chained together. In one embodiment, the new false positive rate is equal to $1-(1-p)^N$, where p is the original false positive rate and N is the number of bit arrays in the chain. For example, if the original false positive rate is 1 in 10 million, the use of 2 bit arrays in the chain will result in the false positive rate of 2 false positives in 10 million, the use of 3 bit arrays in the chain will result in 3 false positives in 10 million, etc. To minimize the effects on the false positive rate, bit array updater 216 may instruct bit array creator 214 to make the size of the new bit array larger than expected to avoid unnecessarily chaining additional bit arrays.

Bit array distributor 218 distributes updated bit arrays after the identified documents have been scanned. In some embodiments, bit array distributor 218 may retrieve an updated bit array from the bit array store 222 and send it to a controller for forwarding to other scanning servers. In one embodiment, the bit array distributor 218 may search for bit arrays that have been marked as updated by bit array updater 216 and then send them to a controller. The controller may store the updated bit array locally, and then forward the updated bit array to the other scanning servers for storage. Alternatively, bit array distributor 218 may send updated bit arrays to other scanning servers directly. When a requested scan is complete and all of the associated bit arrays have been distributed, bit array distributor 218 may also send a message to a controller to indicate that the scan has been finished.

In one embodiment, a controller that receives an updated bit array from bit array distributor 218 may return a message to bit array distributor 218 indicating that the controller has received the updated bit array. Upon receiving this message, bit array distributor 218 may remove the mark that indicates that the bit array has been updated. If the message is not received or an error message is received, the mark is not removed and the bit array distributor 218 may attempt to re-send the updated bit array until the appropriate response is received from the controller.

Bit array distributor 218 may also receive updated bit arrays from a controller or from other scanning servers and store the received bit arrays in bit array store 222. When bit array distributor 218 receives an updated bit array, it may send a message to the sending controller or server indicating that the updated bit array has been received successfully. If the sending controller does not receive the message, it may attempt to re-send the updated bit array to bit array distributor 218 until the appropriate response is received.

Figure 3:
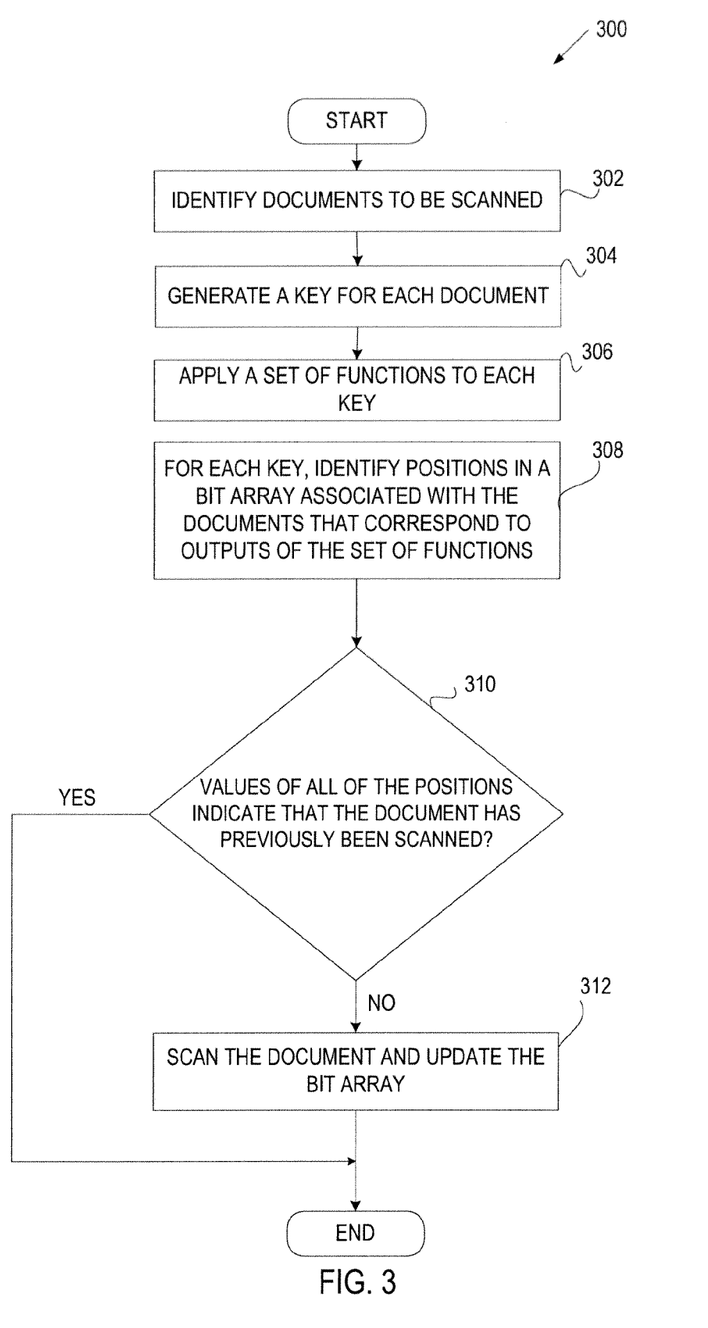
FIG. 3 is a flow diagram of one embodiment of a method for incremental scanning of documents.

FIG. 3 is a flow diagram of one embodiment of a method 300 for incremental scanning of documents. The method 300 is performed by processing logic that may comprise hardware (circuitry, dedicated logic, etc.), software (such as is run on a general purpose computer system or a dedicated machine), or a combination of both. In one embodiment, the method 300 is performed by a scanning server (e.g., scanning server 112) or a scan agent (e.g., scan agent 120).

Referring to FIG. 3, processing logic begins by identifying documents that are to be scanned at step 302. In some embodiments, this request is received from a controller. The request may be initiated by a user or created automatically. Requests may be received automatically on a periodic basis. The documents to be scanned may be associated with a user device or reside in a centralized data repository.

At step 304, processing logic generates a key for each document. In some embodiments, the key may be a string. The key for a particular document may be based on at least one of a file path of the document, a modification date of the document, and the size of the document.

At step 306, processing logic applies a set of functions to each key. The set of functions may be a set of hash functions. When a function in the set of functions is applied to a key, it may indicate a position in a bit array associated with the functions.

At step 308 processing logic identifies the positions in the bit array that correspond to the outputs of the set of functions for each key.

At step 310, processing logic determines whether the values of all of the identified positions indicate that the document has already been scanned. In some embodiments, a value indicates that a document has already been scanned when it is equal to a scanned value (e.g., if the value is 1, it indicates that the document in its current form has been scanned). Conversely, a value indicates that a document has not yet been scanned when it is equal to a non-scanned value (e.g., if the value is 0, it indicates that the document has not yet been scanned).

If the values of all of the identified positions do indicate that the document has previously been scanned, processing logic does not scan the document. If, however, there is at least on position that indicates that the document has not yet been scanned, processing logic scans the document in accordance with at least on DLP policy and updates the bit array to indicate that the document has been scanned at step 312. Updating the bit array may be done by setting all of the identified positions that were previously set to a non-scanned value to a scanned value.

Figure 4:
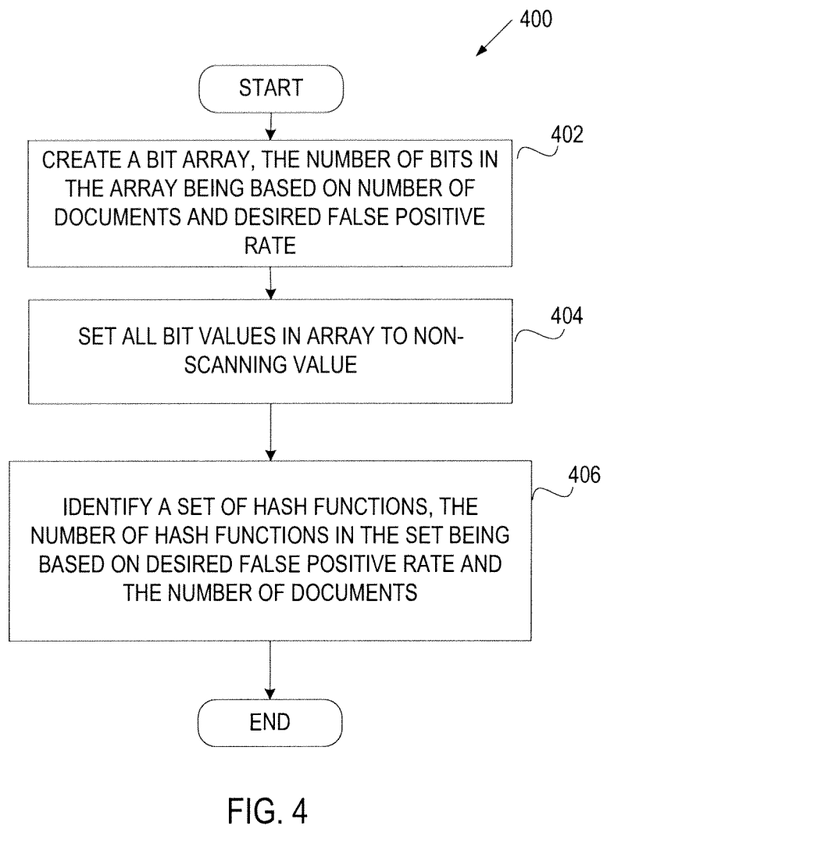
FIG. 4 is a flow diagram of one embodiment of a method for building a bit array for a collection of documents.

FIG. 4 is a flow diagram of one embodiment of a method 400 for building a bit array for a collection of documents. The method 400 is performed by processing logic that may comprise hardware (circuitry, dedicated logic, etc.), software (such as is run on a general purpose computer system or a dedicated machine), or a combination of both. In one embodiment, the method 400 is performed by a scanning server (e.g., scanning server 112) or a scan agent (e.g., scan agent 120).

Referring to FIG. 4, processing logic begins by creating a bit array at step 402. In some embodiments, the bit array is created after receiving a request to scan documents that do not already have an associated bit array. The number of bits in the bit array may be based on the number of documents that are to be scanned (e.g., the number of documents that are in a directory that is to be scanned). The number of bits may also be based on a desired false positive rate. The desired false positive rate is a desired fraction of documents that will be incorrectly designated as previously scanned (e.g., designated as previously scanned when have been introduced or modified since a previous scan). For example, if the desired false positive rate is one in a million, one document of every one million documents that are checked will be incorrectly classified as already having been scanned. This rate may be determined by a system administrator.

At step 404, processing logic sets the values of all of the bits in the array to a non-scanning value.

At step 406, processing logic identifies a set of hash functions. The number of hash functions in the set may be based on the desired false positive rate and the number of documents that are to be scanned.

Figure 5:
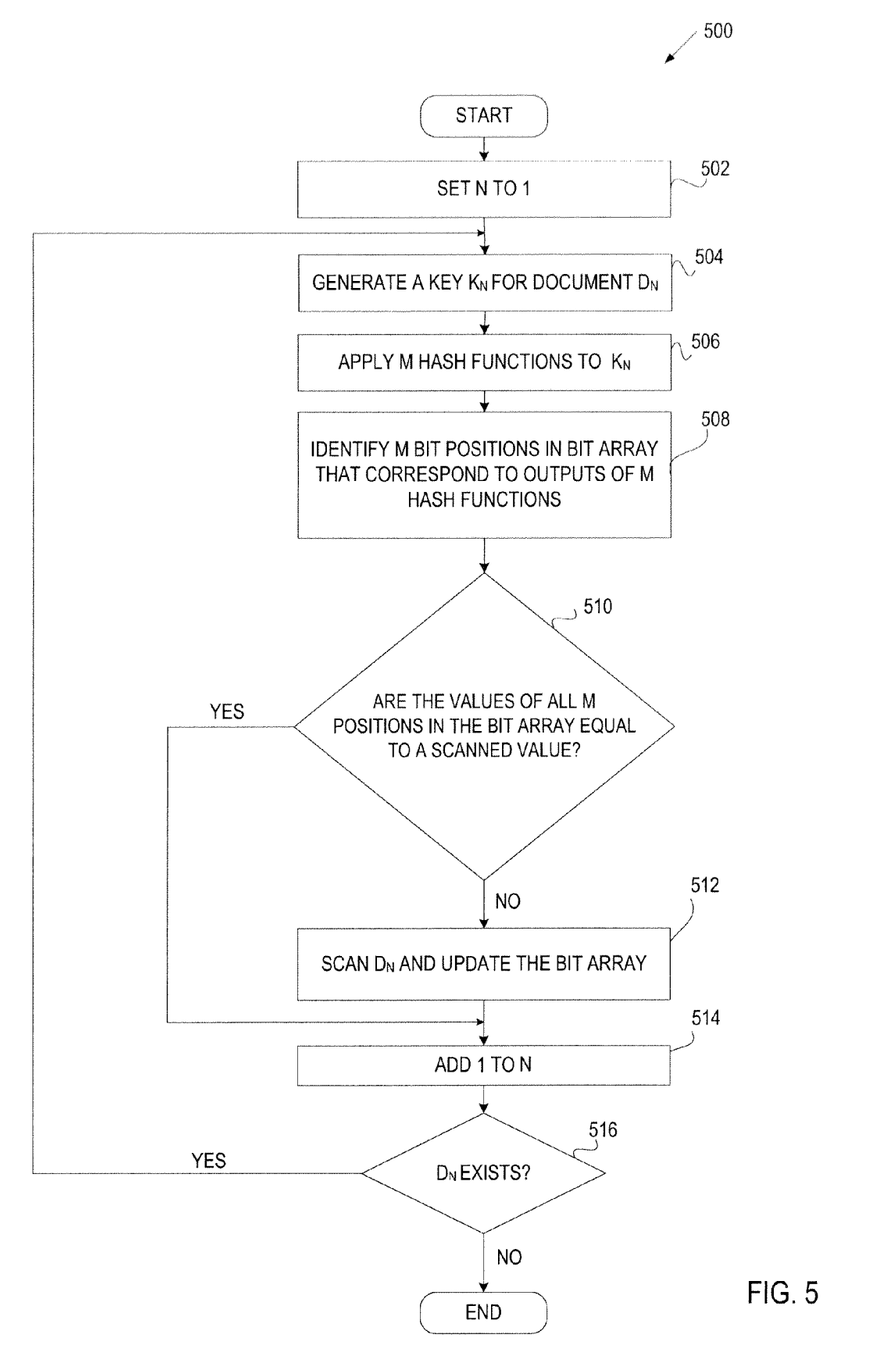
FIG. 5 is a flow diagram of one embodiment of a method for incremental scanning of documents using a Bloom filter.

FIG. 5 is a flow diagram of one embodiment of a method 500 for incremental scanning of documents using a Bloom filter. The method 500 is performed by processing logic that may comprise hardware (circuitry, dedicated logic, etc.), software (such as is run on a general purpose computer system or a dedicated machine), or a combination of both. In one embodiment, the method 500 is performed by a scanning server (e.g., scanning server 112) or a scan agent (e.g., scan agent 120).

Referring to FIG. 5, processing logic begins by setting "N" to 1 at step 502 to begin with the first document in the collection of documents. The incremental scanning uses a Bloom filter bit array and M hash functions. The Bloom filter bit array includes P bits, with each bit being set to either 1 or 0. At step 504, processing logic generates a key $K_N$ for a document $D_N$. $K_N$ may be based on the file path of $D_N$, the date $D_N$ was last modified, and/or the size of $D_N$.

At step 506, processing logic applies M hash functions to $K_N$. M may be determined based on the number of documents that are to be scanned and the desired false positive rate.

Processing logic identifies M bit positions in a bit array that correspond to the outputs of the M hash functions at step 508. At step 510, processing logic checks whether the bit values of all M positions are equal to 1.

If not all of the values of the M bit positions are equal to 1 (e.g., at least one of the values is 0 instead of 1), processing logic scans $D_N$ and updates the bit array by setting the values of all M bit positions to 1 at step 512. If all of the values of the M bit positions are equal to 1, then $D_N$ is not scanned and the method skips to step 414.

At step 514, processing logic adds 1 to N. Processing logic then checks to see if $D_N$ exists at step 516. If $D_N$ does not exist, then all required documents have been scanned and the method ends. If $D_N$ does exist, the method returns to step 404.

Figure 6A:
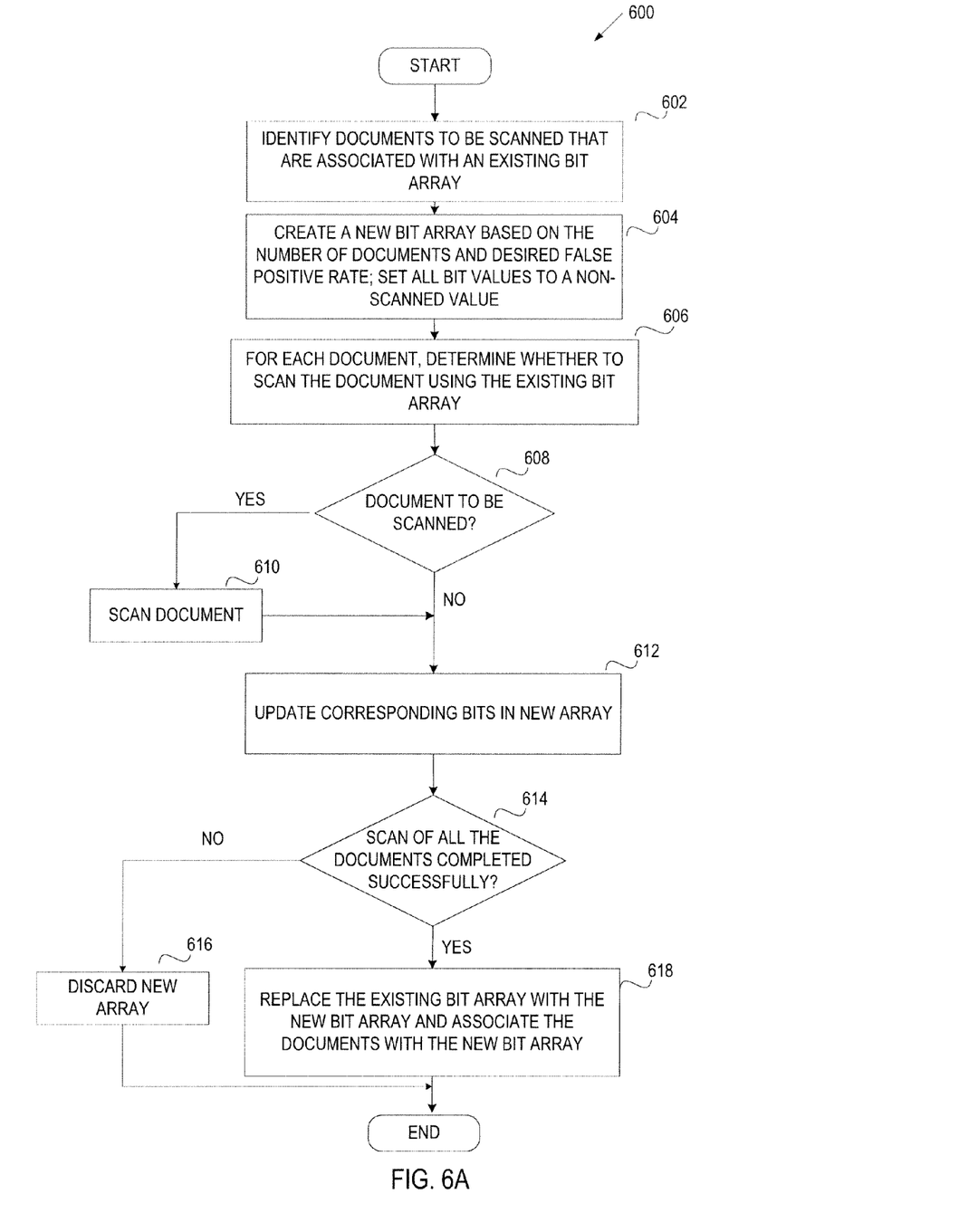
FIG. 6A is a flow diagram of one embodiment of a method for refreshing a bit array for a collection of documents.

FIG. 6A is a flow diagram of one embodiment of a method 600 for refreshing a bit array for a collection of documents. The method 600 is performed by processing logic that may comprise hardware (circuitry, dedicated logic, etc.), software (such as is run on a general purpose computer system or a dedicated machine), or a combination of both. In one embodiment, the method 600 is performed by a scanning server (e.g., scanning server 112) or a scan agent (e.g., scan agent 120).

Referring to FIG. 6A, processing logic identifies documents that are to be scanned that are associated with an existing bit array at step 602. At step 604, processing logic creates a new bit array based on the number of documents and a desired false positive rate and sets all of the bit values in the bit array to a non-scanned value. In some embodiments, a new array is created in conjunction with every scan request Creating a new bit array may be done to ensure that the bit array associated with the identified documents does not become too full because of documents that are no longer part of the identified documents. For each document, processing logic determines whether to scan the document using the existing bit array at step 606. This may be done using the methodology described in conjunction with FIGS. 3 and 5. If the document is to be scanned, processing logic scans the document in accordance with one or more DLP policies at step 610. If the document is not to be scanned, the method skips to step 612.

At step 612, processing logic updates the corresponding bits in the new array to indicate that the object has been scanned (either in the current scan or in a previous scan). This may be done by setting the value of identified positions in the new bit array to a scanned value. The positions may be identified by the outputs of a set of functions applied to a key of the document. In some embodiments, the new bit array is updated in conjunction with updating the existing bit array. After there are no more documents to scan, processing logic checks whether the scan of the documents has been completed successfully at step 618. If the scan has been completed successfully, processing logic replaces the existing bit array with the new bit array and associates the documents with the new bit array at step 618. If, however, the scan has not been completed successfully, the new array is discarded at step 616. This may occur because of network connectivity issues, because of problems accessing at least one of the documents for the scan, etc.

Figure 6B:
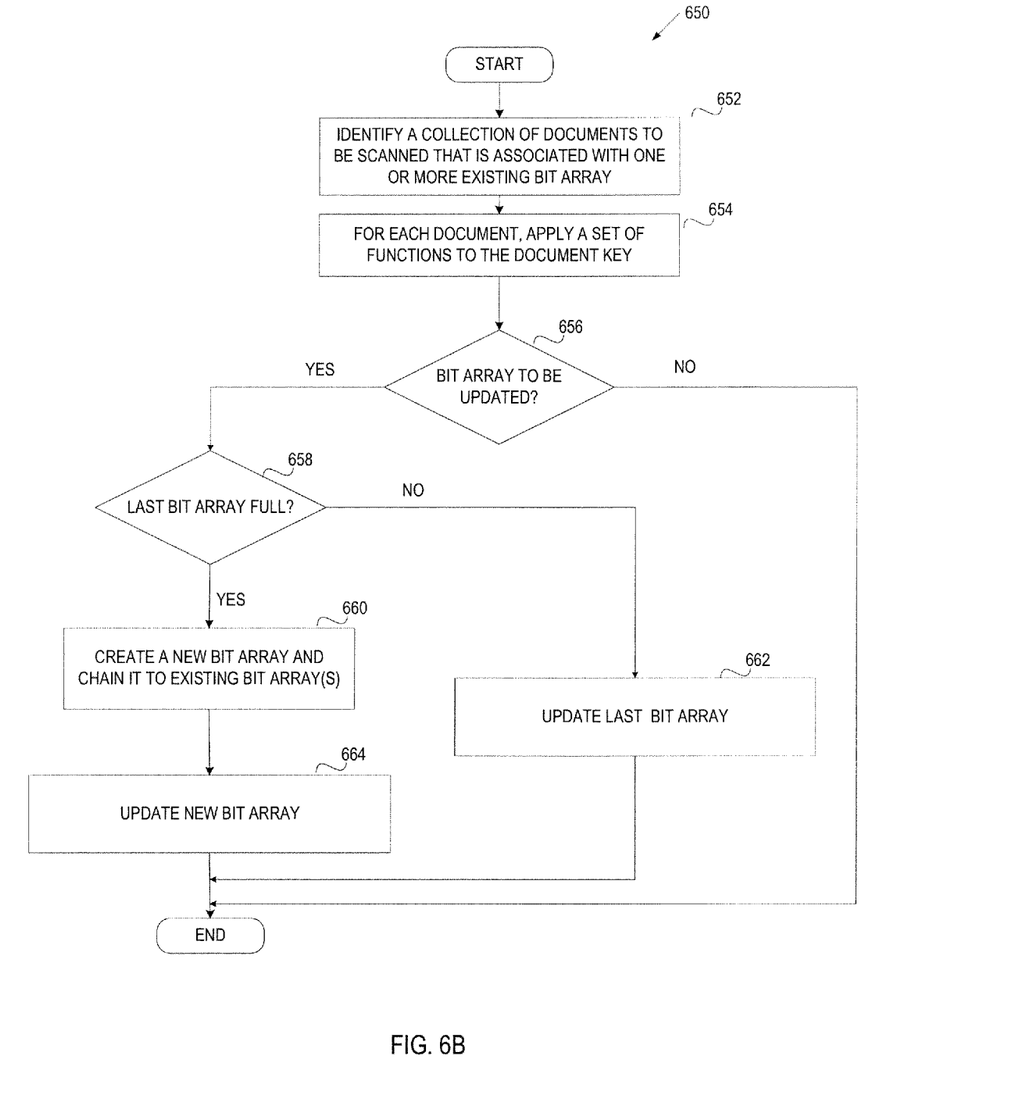
FIG. 6B is a flow diagram of one embodiment of a method for chaining multiple bit arrays for a collection of documents.

FIG. 6B is a flow diagram of one embodiment of a method 650 for chaining multiple bit arrays for a collection of documents. The method 650 is performed by processing logic that may comprise hardware (circuitry, dedicated logic, etc.), software (such as is run on a general purpose computer system or a dedicated machine), or a combination of both. In one embodiment, the method 650 is performed by a scanning server (e.g., scanning server 112) or a scan agent (e.g., scan agent 120).

Referring to FIG. 6B, processing logic identifies a collection of documents to be scanned that is associated with one or more existing bit arrays at step 652. In some embodiments, processing logic is unaware of how many documents have been modified or added to the collection of documents since a previous scan.

At step 654, processing logic applies a set of functions to the document key for each document. The output of the set of functions indicates positions in a bit array.

At step 656, processing logic determines whether a bit array is to be updated for each document. The array is to be updated if any of the indicated positions in the bit array associated with the collection of documents are set to a non-scanned value. If all of the indicated positions are set to a scanned value, processing logic determines that the bit array is not to be updated.

If the collection of documents is associated with multiple chained bit arrays, processing logic checks the indicated positions in each bit array. If any of chained bit arrays indicate that the document has already been scanned (e.g., if the identified positions in at least one of the bit arrays are all set to a scanned value), processing logic determines that the document is not to be scanned and the bit array is not to be updated. Otherwise (e.g., if all of the chained bit arrays have at least one identified position set to a non-scanned value), processing logic determines that the document is to be scanned and the last bit array in the chain is to be updated. If no updates are needed, the method ends.

If the bit array (or the chain of bit arrays) is to be updated, processing logic checks to see if the last bit array in the chain is full at step 658. Processing logic checks to see if the bit array is full based on whether a dependency between the number of document scans associated with the bit array (e.g., the number of times the bit array has been updated to indicate that a document has been scanned), the size of the bit array, and the false positive rate indicates that a desired false positive rate would be exceeded if the bit array were to be updated.

If the last bit array in the chain is not full, processing logic updates the last bit array in the chain at step 662. If the last bit array in the chain is full, processing logic creates a new bit array, sets all of the bit values to a non-scanned value, and chains it to the existing bit arrays at step 660. Processing logic may chain the new array to the existing bit arrays by associating the collection of documents with the array and associating the new bit array with the existing bit arrays. Because chaining bit arrays may increase the false positive rate, processing logic may set the size of the created array to be larger than currently needed in order to minimize the number of bit arrays that have to be chained.

Figure 7:
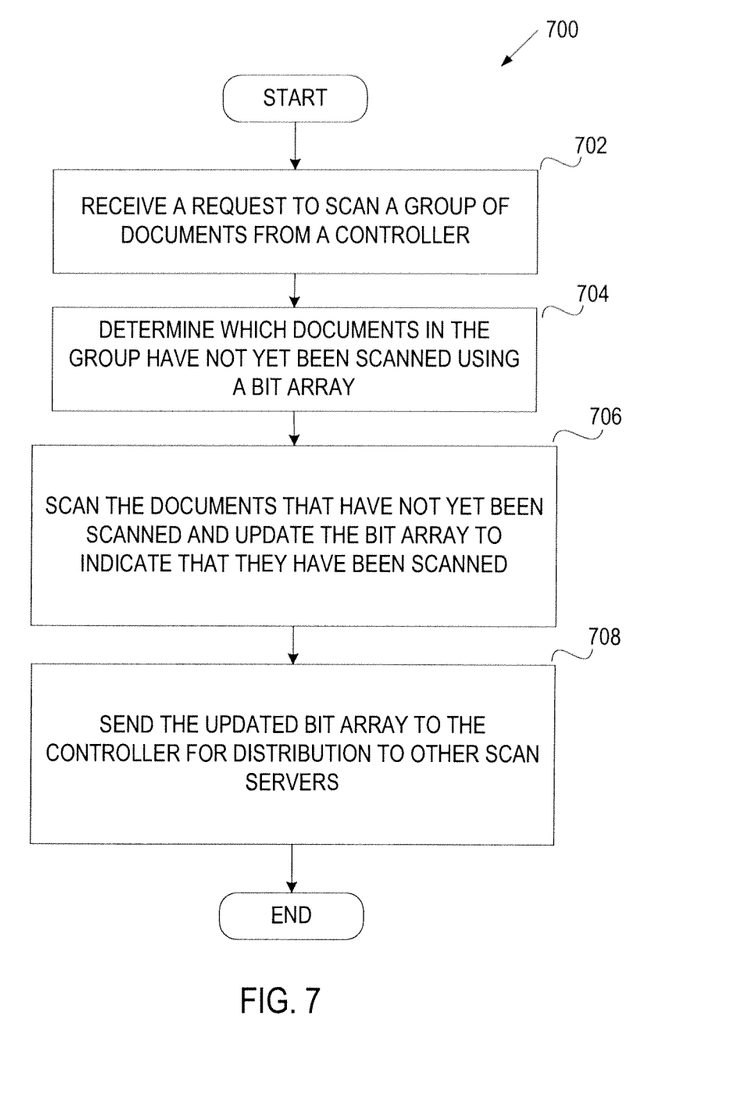
FIG. 7 is a flow diagram of one embodiment of a method for facilitating distribution of up-to-date bit arrays across scanning servers.

At step 664, processing logic updates the corresponding bits in the new array. This may be done by setting the value of identified positions in the new bit array to a scanned value. In some embodiments, the new bit array is updated without updating the existing bit arrays to ensure that newly scanned documents are still classified as scanned without the existing bit arrays becoming too full and exceeding the desired false positive rate. FIG. 7 is a flow diagram of one embodiment of a method 500 for facilitating distribution of up-to-date bit arrays across scanning servers. The method 700 is performed by processing logic that may comprise hardware (circuitry, dedicated logic, etc.), software (such as is run on a general purpose computer system or a dedicated machine), or a combination of both. In one embodiment, the method 700 is performed by a scanning server (e.g., scanning server 112).

Referring to FIG. 7, the method begins with processing logic receiving a request to scan a group of documents from a controller at step 702. The documents may be stored in a centralized data repository and a controller may request them to be scanned based on one or more DLP policies and may provide an up-to-date bit array to be used for scanning.

At step 704, processing logic determines which documents in the group have not yet been scanned using the bit array. This may be done using methodology described in FIG. 3. At step 706, processing logic scans the documents that have not yet been scanned in accordance with a DLP policy and updates the bit array to indicate that the documents have been scanned.

At step 708, after scanning of the requested documents is complete, processing logic sends the updated bit array to the controller for distribution to other scanning servers. Processing logic may store a copy of the updated bit array in a local bit array store before sending it to the controller. Upon receiving the updated bit array, the controller may store the bit array and then send copies of the bit array to all other scanning servers via a network.

Figure 8:
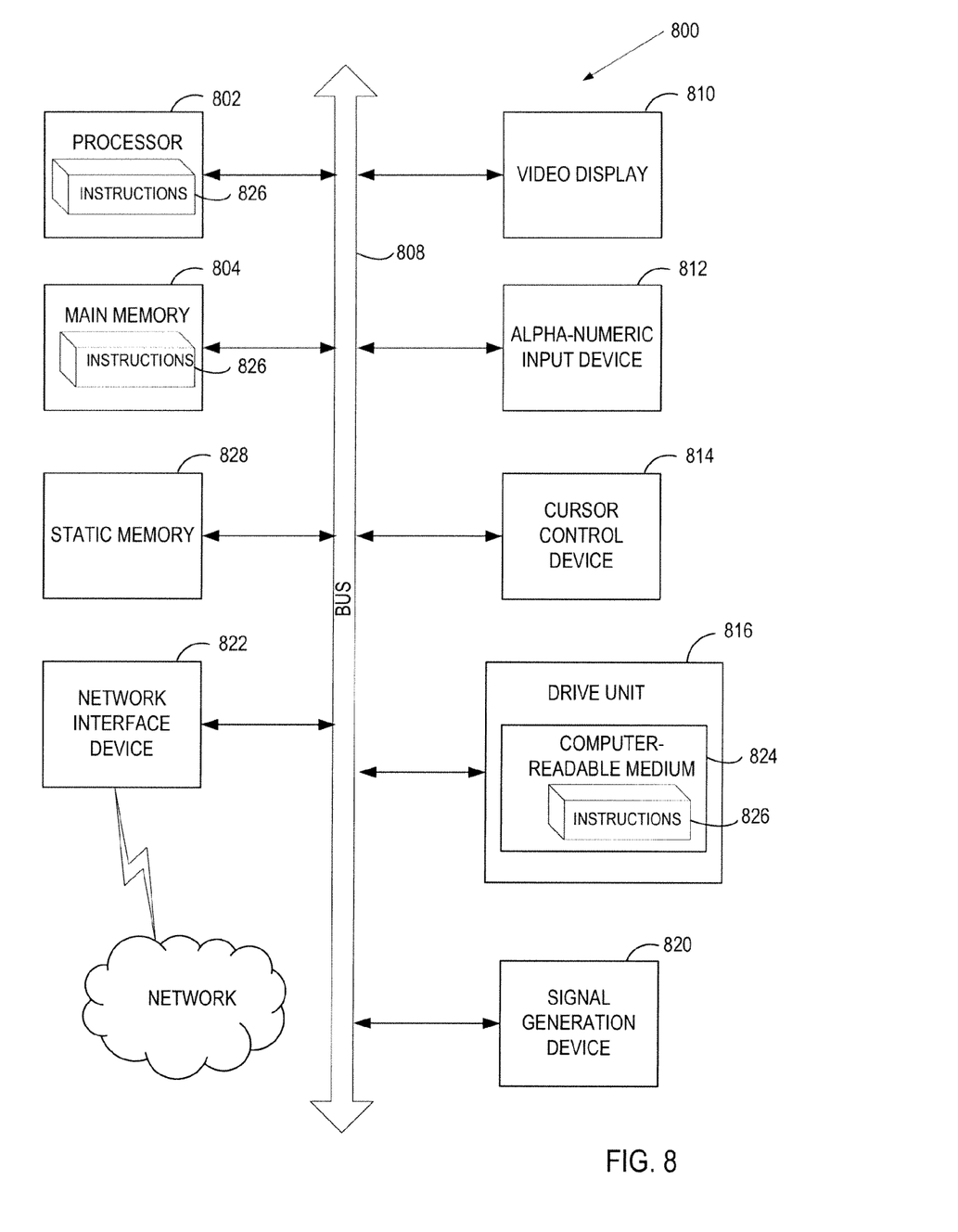
FIG. 8 illustrates a diagrammatic representation of a machine in the exemplary form of a computer system.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device (processor) 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 818, which communicate with each other via a bus 806.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 may also be one or more special-purpose processing devices such as an application specific integrated circuit (ASIC), a field programmable gate array (FPGA), a digital signal processor (DSP), network processor, or the like. The processor 802 is configured to execute the processing logic 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-readable medium 824 on which is stored one or more sets of instructions (e.g., software 826) embodying any one or more of the methodologies or functions described herein. The software 826 may also reside, completely or at least partially, within the main memory 804 and/or within the processor 802 during execution thereof by the computer system 800, the main memory 804 and the processor 802 also constituting computer-readable media. The software 826 may further be transmitted or received over a network 820 via the network interface device 822.

While the computer-readable medium 824 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present invention. The term "computer-readable medium" shall accordingly be taken to include, but not be limited to, solid-state memories, optical media, and magnetic media.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying", "applying", "refraining", "scanning", "updating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer selectively activated or reconfigured by a computer program stored in the computer. As discussed above, such a computer program may be stored in a computer readable medium.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

I claim:

1. A computer-implemented method comprising:
   identifying, by a computer system, a plurality of documents to be scanned for sensitive information according to at least one data loss prevention (DLP) policy, the plurality of documents being associated with a bit array;
   generating a key of the document;
   for each of the plurality of documents, applying a set of functions to the key of the document, wherein outputs of the functions in the set of functions map the key to positions in the bit array;
   identifying a plurality of positions in the bit array that correspond to the outputs of the functions in the set of functions;
   when values of all of the plurality of positions in the array indicate that the document has already been scanned, refraining from scanning the document; and
   when a value of at least one of the plurality of positions in the array indicates that the document has not yet been scanned, scanning the document for sensitive information according to the DLP policy.

2. The computer-implemented method of claim 1, further comprising:
   updating the bit array to indicate that the document has been scanned after scanning the document for sensitive information.

3. The computer-implemented method of claim 2, wherein the computer system is one of a plurality of scanning servers.

4. The computer-implemented method of claim 3, further comprising:
   sending the updated bit array to a controller for distribution to one or more of the plurality of scanning servers.

5. The computer-implemented method of claim 1, further comprising:
   generating a key for each of the plurality of documents.

6. The computer-implemented method of claim 5, wherein the key is generated based on at least one of a file path, a modification date, and a size of the document.

7. The computer-implemented method of claim 1, wherein the set of functions is a set of hash functions.

8. The computer-implemented method of claim 1, further comprising:
   determining whether the plurality of documents is associated with a bit array; and
   when the plurality of documents is not associated with a bit array, creating a bit array and associating the plurality of documents with the created bit array.

9. The computer-implemented method of claim 1, further comprising:
   creating a new bit array for the plurality of documents associated with an existing bit array;
   updating the new bit array to identify documents in the plurality of documents that have been scanned for sensitive information; and
   replacing the existing bit array with the new bit array.

10. The computer-implemented method of claim 1, further comprising:
    determining that the existing bit array is full;
    creating a new bit array for the plurality of documents;
    chaining the new bit array to the existing bit array;
    when values of all of the plurality of positions in the new array indicate that the document has already been scanned, refraining from scanning the document; and
    updating the new bit array to identify that the document has been scanned after scanning the document for sensitive information.

11. A non-transitory computer readable storage medium that provides instructions, which when executed on a computer system cause the computer system to perform a method comprising:
    identifying, by the computer system, a plurality of documents to be scanned for sensitive information according to at least one data loss prevention (DLP) policy, the plurality of documents being associated with a bit array;
    generating a key of the document;
    for each of the plurality of documents, applying a set of functions to the key of the document, wherein outputs of the functions in the set of functions map the key to positions in the bit array;
    identifying a plurality of positions in the bit array that correspond to the outputs of the functions in the set of functions;
    when values of all of the plurality of positions in the array indicate that the document has already been scanned, refraining from scanning the document; and
    when a value of at least one of the plurality of positions in the array indicates that the document has not yet been scanned, scanning the document for sensitive information according to the DLP policy.

12. The non-transitory computer readable storage medium of claim 11, wherein the method further comprises:

updating the bit array to indicate that the document has been scanned after scanning the document for sensitive information.

13. The non-transitory computer readable storage medium of claim 11, wherein the method further comprises:
generating a key for each of the plurality of documents, wherein the key is generated based on at least one of a file path, a modification date, and a size of the document.

14. The non-transitory computer readable storage medium of claim 11, wherein the method further comprises:
creating a new bit array for the plurality of documents associated with an existing bit array;
updating the new bit array to identify documents in the plurality of documents that have been scanned for sensitive information; and
replacing the existing bit array with the new bit array.

15. The non-transitory computer readable storage medium of claim 11, wherein the method further comprises:
determining that the existing bit array is full;
creating a new bit array for the plurality of documents;
chaining the new bit array to the existing bit array;
when values of all of the plurality of positions in the new array indicate that the document has already been scanned, refraining from scanning the document; and
updating the new bit array to identify that the document has been scanned after scanning the document for sensitive information.

16. A system, comprising:
a memory; and
a processor coupled with the memory to:
identify a plurality of documents to be scanned for sensitive information according to at least one data loss prevention (DLP) policy, the plurality of documents being associated with a bit array;
generate a key of the document;
for each of the plurality of documents, apply a set of functions to the key of the document, wherein outputs of the functions in the set of functions map the key to positions in the bit array;
identify a plurality of positions in the bit array that correspond to the outputs of the functions in the set of functions;
when values of all of the plurality of positions in the array indicate that the document has already been scanned, refrain from scanning the document; and
when a value of at least one of the plurality of positions in the array indicates that the document has not yet been scanned, scan the document for sensitive information according to the DLP policy.

17. The system of claim 16, wherein the processor is further to:
update the bit array to indicate that the document has been scanned after scanning the document for sensitive information.

18. The system of claim 16, wherein the processor is further to:
generate a key for each of the plurality of documents, wherein the key is generated based on at least one of a file path, a modification date, and a size of the document.

19. The system of claim 16, wherein the processor is further to:
create a new bit array for the plurality of documents associated with an existing bit array;
update the new bit array to identify documents in the plurality of documents that have been scanned for sensitive information; and
replace the existing bit array with the new bit array.

20. The system of claim 16, wherein the processor is further to:
determine that the existing bit array is full;
create a new bit array for the plurality of documents;
chain the new bit array to the existing bit array;
when values of all of the plurality of positions in the new array indicate that the document has already been scanned, refrain from scanning the document; and
update the new bit array to identify that the document has been scanned after scanning the document for sensitive information.

* * * * *